(12) United States Patent
Davis et al.

(10) Patent No.: US 8,323,614 B2
(45) Date of Patent: Dec. 4, 2012

(54) HYDROLYSIS REACTOR FOR HYDROGEN PRODUCTION

(75) Inventors: Thomas A. Davis, El Paso, TX (US); Michael A. Matthews, Columbia, SC (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 12/874,769

(22) Filed: Sep. 2, 2010

(65) Prior Publication Data
US 2011/0052487 A1    Mar. 3, 2011

Related U.S. Application Data

(60) Provisional application No. 61/275,763, filed on Sep. 2, 2009.

(51) Int. Cl.
*C01B 3/02* (2006.01)
*C01B 3/24* (2006.01)

(52) U.S. Cl. ..................... 423/648.1; 423/650

(58) Field of Classification Search ............. 423/648.1
See application file for complete search history.

(56) References Cited

U.S. PATENT DOCUMENTS

| | | | | |
|---|---|---|---|---|
| 5,702,491 | A * | 12/1997 | Long et al. | 48/197 R |
| 6,811,764 | B2 * | 11/2004 | Jorgensen et al. | 423/658.2 |
| 7,445,860 | B2 * | 11/2008 | Rezachek et al. | 429/421 |
| 2004/0052723 | A1 * | 3/2004 | Jorgensen | 423/648.1 |
| 2007/0020172 | A1 * | 1/2007 | Withers-Kirby et al. | 423/648.1 |
| 2007/0020175 | A1 * | 1/2007 | Graham et al. | 423/658.2 |

* cited by examiner

*Primary Examiner* — Melvin C Mayes
*Assistant Examiner* — Kenneth Vaden
(74) *Attorney, Agent, or Firm* — Dority & Manning, P.A.

(57) ABSTRACT

In accordance with certain embodiments of the present disclosure, a method for hydrolysis of a chemical hydride is provided. The method includes adding a chemical hydride to a reaction chamber and exposing the chemical hydride in the reaction chamber to a temperature of at least about 100° C. in the presence of water and in the absence of an acid or a heterogeneous catalyst, wherein the chemical hydride undergoes hydrolysis to form hydrogen gas and a byproduct material.

15 Claims, 2 Drawing Sheets

Hydrolysis of $NaBH_4$ in an inclined rotating tube.

Figure 1. Photographs of sodium borohydride being exposed to steam.

Figure 2. Results of steam hydrolysis tests at different temperatures and humidities.

Figure 3. Flow diagram for hydrolysis of molten NaBH$_4$.

Figure 4. Hydrolysis of NaBH$_4$ in an inclined rotating tube.

HYDROLYSIS REACTOR FOR HYDROGEN PRODUCTION

CROSS-REFERENCE TO RELATED APPLICATION

The present application is based on and claims priority to U.S. Provisional Application 61/275,763 having a filing date of Sep. 2, 2009, which is incorporated by reference herein.

FEDERALLY SPONSORED RESEARCH

This invention was made with government support under DE-FC36-04GO-14232 awarded by the Department of Energy. The government retains certain rights in the invention.

BACKGROUND

Hydrides are in a class of reactive chemicals that convert water into hydrogen by reacting with the oxygen to form a benign byproduct; hence they are regarded as a medium for storing hydrogen for fuel cells. Because of their relatively high production cost, hydrides will likely be applied in situations where their potential benefits of high hydrogen production per unit weight or unit volume are more important than their production cost. Hydrides are quite stable to degradation over long periods of time provided they are kept dry. Therefore, they have the potential for use in applications where they can be stored for extended periods at ambient temperature and pressure and then processed to supply hydrogen on demand. They are particularly applicable to small-scale fuel cells as replacements for batteries.

A key to a successful compact device for on-demand hydrogen production is the ability to process the reactive chemicals in a safe manner. It would be particularly beneficial to perform the hydrolysis in a compact device that uses a dry chemical hydride as the feed to a reactor.

SUMMARY

The present disclosure relates to a novel reactor configuration and a novel method for delivering a hydride to a reaction zone in a manner that allows rapid reaction with water to produce hydrogen. The invention is described with emphasis on sodium borohydride but is applicable to any chemical that reacts with water to produce hydrogen. The method of the present disclosure avoids the use of acid or a heterogeneous catalyst to cause the hydrolysis reaction to take place at a useful rate.

For instance, in certain embodiments of the present disclosure a method for hydrolysis of a chemical hydride is provided. The method includes adding a chemical hydride to a reaction chamber and exposing the chemical hydride in the reaction chamber to a temperature of at least about 100° C. in the presence of water and in the absence of an acid or a heterogeneous catalyst, wherein the chemical hydride undergoes hydrolysis to form hydrogen gas and a byproduct material.

In still other embodiments of the present disclosure, a method for hydrolysis of a chemical hydride is provided. The method includes adding a chemical hydride to a reaction chamber. The chemical hydride is exposed in the reaction chamber to a temperature of at least about 100° C. in the presence of water such that the relative humidity in the reaction chamber is at least about 20%. The chemical hydride is exposed to such conditions in the absence of an acid or a heterogeneous catalyst. The chemical hydride undergoes hydrolysis to form hydrogen gas and a byproduct material. The hydrogen gas is collected.

BRIEF DESCRIPTION OF THE FIGURES

A full and enabling disclosure of the present subject matter, including the best mode thereof, to one of ordinary skill in the art, is set forth more particularly in the remainder of the specification, including reference to the accompanying figures in which.

DETAILED DESCRIPTION

Reference will now be made in detail to embodiments of the disclosed subject matter, one or more examples of which are set forth below. Each example is provided by way of explanation of the subject matter, not limitation of the subject matter. In fact, it will be apparent to those skilled in the art that various modifications and variations can be made in the present disclosure without departing from the scope or spirit of the subject matter. For instance, features illustrated or described as part of one embodiment, can be used on another embodiment to yield a still further embodiment.

The present disclosure describes a novel method for exposing a hydride such as $NaBH_4$ to water in a manner that the hydrolysis will take place without the need for a catalyst. The scope of the invention includes reaction of any chemical hydride with water under conditions of temperature and humidity that cause a hydrolysis reaction to occur. Examples of chemical hydrides include, but are not limited to $NaBH_4$, $LiAlH_4$, $NaAlH_4$, and $LiBH_4$. While the present disclosure includes addition of liquid water to the reaction solution, addition of water as a vapor is another embodiment of the present disclosure.

Figure 1:
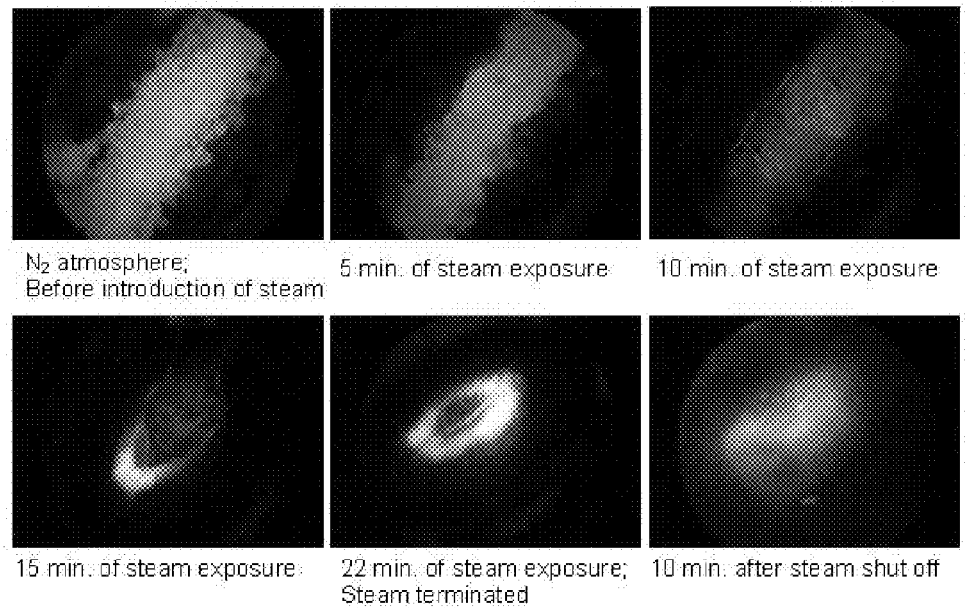
FIG. 1 illustrates photographs taken through a borescope in accordance with certain embodiments of the present disclosure.

Research has revealed that there are conditions under which $NaBH_4$ powder at higher temperatures (e.g. near or greater than 100° C.) absorbs water vapor and forms a viscous solution. Observations of that phenomenon were made through a borescope where the sample of $NaBH_4$ was placed in a glass tube that was heated to about 110° C. before 75% steam was admitted to the tube. The photographs (shown in FIG. 1) taken through the borescope reveal the appearance of the material in the tube. As steam flowed past the powder, the appearance changed from opaque to translucent as the hygroscopic $NaBH_4$ absorbed water. The viscous mass was observed to form bubbles that burst, releasing hydrogen gas. As time passed, the mass appeared to become more viscous and the evolution of gas ceased. After the steam was turned off, the product formed a white film on the inner walls of the tube, presumably sodium metaborate ($NaBO_2$). These observations indicate that, even at an elevated temperature of 110° C., sufficient water is absorbed from steam to dissolve $NaBH_4$ into a concentrated solution in which $NaBH_4$ hydrolyzes to release hydrogen gas and $NaBO_2$ byproduct. These observations are surprising, because one of ordinary skill in the art is accustomed to observing deliquescence at cool temperatures.

Figure 2:
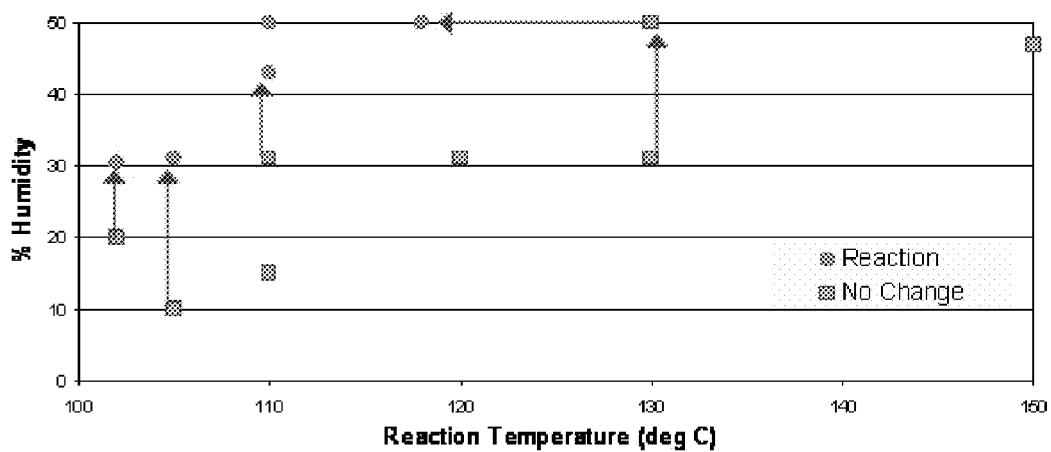
FIG. 2 illustrates the results of experiments where visual observations were made through a borescope when $NaBH_4$ was exposed at several temperatures to a flowing gas stream at several levels of humidity in accordance with certain embodiments of the present disclosure.

FIG. 2 shows results of experiments where visual observations were made through the borescope when $NaBH_4$ was exposed at several temperatures to a flowing gas stream at several levels of humidity in a study to determine the minimum humidity required to initiate the hydrolysis reaction. No change in the $NaBH_4$ was observed at 105° C. with 20% humidity, but reaction occurred when humidity was raised to 30%. At 50% humidity no change was observed at 130° C., but reaction occurred when temperature was lowered to about 117° C. These results suggest that higher humidity is required to achieve a reaction at higher temperature.

In certain embodiments of the present disclosure, the chemical hydride is exposed to a temperature of at least about 100° C., while in other embodiments, the chemical hydride is exposed to a temperature of at least about 110° C., while in still other embodiments, the chemical hydride is exposed to a temperature of at least about 120° C.

In certain embodiments of the present disclosure, the chemical hydride is exposed to a temperature of not greater than about 150° C., while in other embodiments, the chemical hydride is exposed to a temperature of not greater than about 130° C.

In certain embodiments of the present disclosure, the chemical hydride is exposed to a relative humidity of at least about 20%, while in other embodiments of the present disclosure, the chemical hydride is exposed to a relative humidity of at least about 30%, while in other embodiments of the present disclosure, the chemical hydride is exposed to a relative humidity of at least about 40%, while in still other embodiments of the present disclosure, the chemical hydride is exposed to a relative humidity of at least about 50%.

The dissolution of $NaBH_4$ in water at ambient and moderately elevated temperatures produces a very slow hydrolysis reaction. By raising the temperature of the solution, one can simultaneously achieve an increase in the solubility of the reactant, $NaBH_4$, and the reaction byproduct, $NaBO_2$. Further, by addition of water as steam, one can maintain more effective control of the reaction conditions.

Figure 3:
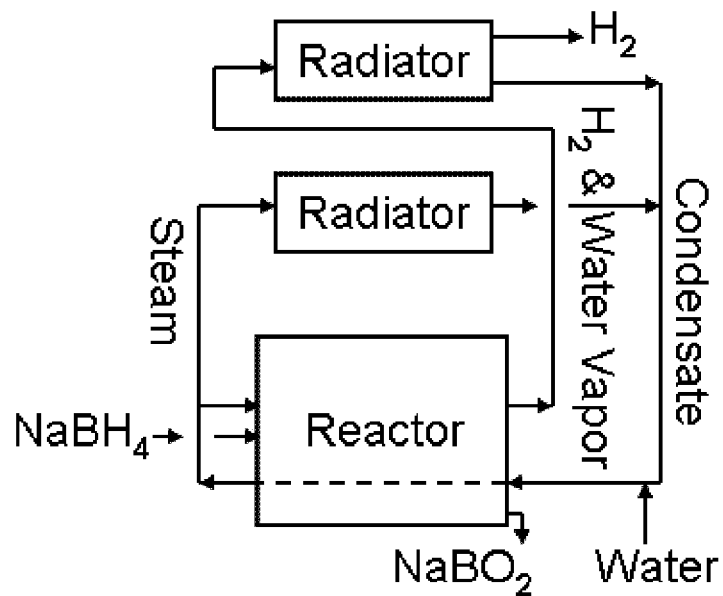
FIG. 3 illustrates a flow diagram for hydrolysis of $NaBH_4$ in accordance with certain embodiments of the present disclosure.

The simple flow diagram in FIG. 3 shows the basic features of the process.

The hydrolysis reaction is exothermic, and the heat of the reaction is more than sufficient to produce the steam required for the reaction. Also, water evaporation can be used to cool the reaction. A portion of the steam generated from reaction heat can be diverted to a condensing radiator, and the condensate from that radiator can be recovered and reused to make more steam. The amount of steam diverted to the radiator can be controlled by, for example, a back-pressure valve (not shown in FIG. 3). Further, the water vapor that is carried away in the produced hydrogen steam can be condensed in a radiator and returned to make more steam for the reaction. The pressure in the second radiator can be controlled, for example, by a back-pressure valve on the $H_2$ discharge line.

FIG. 3 indicates introduction of steam and $NaBH_4$ from the same end of the reactor, but these feeds can be from opposite ends of the reactor and still fall within the scope of the present disclosure. In certain embodiments of the present disclosure, liquid water entering the reactor flows through a heat exchanger that is in contact with either the liquid phase or the vapor phase or with both. FIG. 3 depicts the heat exchanger to be inside the reactor. An internal heat exchanger could comprise one or more tubes inside the reactor. In another embodiment of the present disclosure, the heat exchanger could comprise a jacket on the outside of a tubular reactor. Having the water flowing on the outside of the reactor would reduce the temperature of the reactor surface and thus reduce the need for insulation. The concept of the present disclosure also includes heat exchangers that are external to the reactor. In other embodiments of the present disclosure, the inlet water can be utilized to cool the solution containing $NaBO_2$ in order to cause crystallization of the $NaBO_2$ in a first heat exchanger. Then in a second heat exchanger, the water picks up more heat from the gas stream exiting the reactor.

Figure 4:
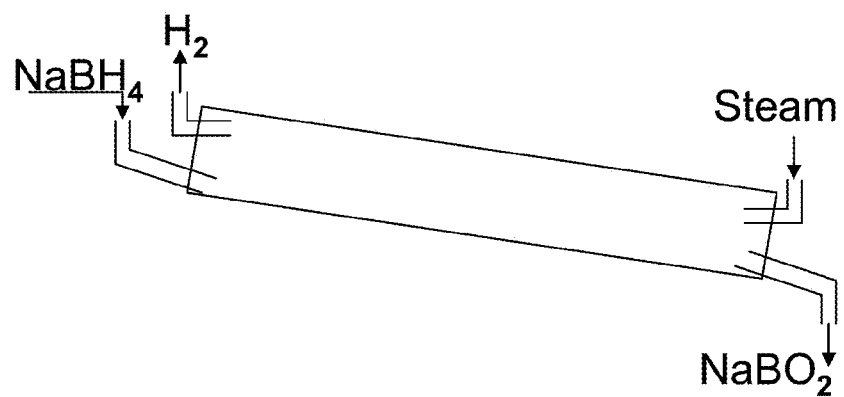
FIG. 4 illustrates hydrolysis of $NaBH_4$ in an inclined rotating tube in accordance with certain embodiments of the present disclosure.

The reactor can be of any design that is capable of bringing a vapor in contact with a liquid. Useful reactor configurations include, but are not limited to, a falling-film tubular reactor; an inclined, rotating tube, similar to a cement kiln; and a tube with a rotating auger. FIG. 4 illustrates the use of an inclined, rotating tube. The solid $NaBH_4$ enters the upper end of the tube, and the rotation causes it to spread over the inner wall of the tube. As gravity moves the viscous mass downward, its surface is exposed to water vapor. As the material travels down the tube, it is converted from $NaBH_4$ to $NaBO_2$. Depending on the operating conditions of the reactor, the material that exists at the bottom could be a viscous liquid, a solid, or a mixture of the two. The lower end of the reactor could be fitted with a scraper to disengage the material from the wall of the tube.

One reactor configuration is a pressurized screw conveyor with two reaction zones. $NaBH_4$ is brought into contact with the steam in the primary reaction zone, and the reaction is completed in the secondary reaction zone. A stack of $NaBH_4$ pellets is pushed through a sealing gland, and each pellet that enters the primary reaction zone dissolves and/or disintegrates due to absorption of moisture from steam. The reacting mixture is conveyed by an auger driven by an electric motor or some other means of rotating the auger. In addition to conveying the reacting material through the reactor, the auger serves to physically break up and mix the dissolving pellets, enhancing contact between the steam and the reactant. The power input required for the mixing of the dissolving solid is much lower than what would be required for comminution of dry $NaBH_4$ pellets. The $NaBH_4$ reacts with steam, releases hydrogen, and produces hydrated $NaBO_2$. A semi-solid mixture of $NaBH_4$ and hydrated $NaBO_2$ enters a secondary reactor where the exothermic reaction continues. The heat from the continuing reaction decomposes the hydrate and produces more water to drive the hydrolysis reaction to completion in the secondary reactor.

The reaction chamber is the site of several chemical operations, including adsorption of water, agitation to disperse particles and improve mass transfer, hydrolysis with gas evolution, heat transfer, and crystallization. The primary reaction vessel is expected to be configured like a screw conveyor, essentially an auger rotating inside of a tube. Pellets of $NaBH_4$ are held in a suitable container, such as a cylinder, and pushed by suitable means, such as a piston, into the reaction vessel one at a time. A sealing gland prevents leakage of hydrogen and moisture into the pellet storage area. The material transported by the auger is a suspension of particles of $NaBH_4$ dispersed in a saturated solution of $NaBH_4$ at the feed end of the reactor. As the material moves down the reactor the dissolved $NaBH_4$ reacts with water in the solution to produce hydrogen gas and dissolved $NaBO_2$. At some point along the path the solution becomes supersaturated with respect to $NaBO_2$, and then crystals of $NaBO_2.xH_2O$ begin to form.

The conversion of $NaBH_4$ to hydrogen and $NaBO_2$ may not reach completion in the primary reactor. Full conversion would require excessive water and excessive residence time in the reactor. In one embodiment, the partially reacted mixture, expected to be a mixture of particles of $NaBH_4$ and $NaBO_2 \cdot xH_2O$ suspended in a solution saturated with respect to both solutes, is transferred to an insulated secondary reactor where the reaction will go to completion. Since the hydrolysis reaction is exothermic, the temperature in the secondary reactor is expected to increase. The exotherm of the reaction of water with $NaBH_4$ heats the reactants and causes decomposition of the hydrated borate, reducing the value of x in the $NaBO_2 \cdot xH_2O$ particles. The water released form the hydrate supplies water for the continued reaction with the remaining $NaBH_4$. The byproduct $NaBO_2$ is collected for disposal or reuse in the production of $NaBH_4$.

One embodiment of a reactor in accordance with the present disclosure includes an auger bit, which is generally used for drilling holes in wood. The drive end of the auger bit is installed in a chuck mounted to a low-speed motor with a variable-speed drive. The sharp tip of the bit is replaced with a stainless steel rod. The rod is inserted in a bearing mounted in the end of a glass tube with an inside diameter close to that of the auger bit. Fittings for introducing the pellets and steam and for discharging the reaction products are installed on the ends of the tube in a manner that will allow easy disassembly for cleaning.

When a stainless-steel tube is used for the reactor, a coil of tubing is wrapped around the reactor, and heat from the reaction is used to generate steam from water injected into the coil. One method of operation is to convey the products as solids into an insulated vessel (the secondary reactor) where they will continue to evolve hydrogen as the water of hydration in the $NaBO_2 \cdot xH_2O$ reaction is released and reacts with the residual $NaBH_4$. Furthermore, the secondary reactor can process the solid reaction products continuously. The tube can be fitted with a tee, or perhaps several tees, to convey the gasses out of the reactor. The gas and solids would flow co-currently in the primary reactor stage and would flow counter-currently in the second stage.

In the interests of brevity and conciseness, any ranges of values set forth in this specification are to be construed as written description support for claims reciting any sub-ranges having endpoints which are whole number values within the specified range in question. By way of a hypothetical illustrative example, a disclosure in this specification of a range of 1-5 shall be considered to support claims to any of the following sub-ranges: 1-4; 1-3; 1-2; 2-5; 2-4; 2-3; 3-5; 3-4; and 4-5.

These and other modifications and variations to the present disclosure can be practiced by those of ordinary skill in the art, without departing from the spirit and scope of the present disclosure, which is more particularly set forth in the appended claims. In addition, it should be understood that aspects of the various embodiments can be interchanged both in whole or in part. Furthermore, those of ordinary skill in the art will appreciate that the foregoing description is by way of example only, and is not intended to limit the disclosure so further described in such appended claims. $NaBH_4$ is used herein to illustrate the present invention but is not intended to limit the scope of the invention.

What is claimed:

1. A method for hydrolysis of a chemical hydride comprising:
    adding a chemical hydride to a first reaction chamber;
    exposing the chemical hydride in the first reaction chamber to a temperature of at least about 100° C. in the presence of water such that the relative humidity in the reaction chamber is at least about 20% in the absence of an acid or a heterogeneous catalyst, wherein a portion of the chemical hydride undergoes hydrolysis to form hydrogen gas and a byproduct material while the remaining portion of chemical hydride remains unreacted, and further wherein a portion of the water forms steam as a result of heat generated by the hydrolysis;
    feeding the hydrogen gas and steam to a condensing radiator wherein condensate water formed from the steam is returned to the first reaction chamber from the condensing radiator; and
    transferring the remaining unreacted portion of the chemical hydride and the byproduct material to a second reaction chamber wherein the unreacted portion of the chemical hydride undergoes hydrolysis to form hydrogen gas.

2. The method of claim 1, wherein the chemical hydride comprises $NaBH_4$, $LiAlH_4$, $NaAlH_4$, $LiBH_4$, or combinations thereof.

3. The method of claim 1, wherein the chemical hydride comprises $NaBH_4$.

4. The method of claim 1, wherein the chemical hydride comprises $LiAlH_4$.

5. The method of claim 1, wherein the chemical hydride comprises $NaAlH_4$.

6. The method of claim 1, wherein the chemical hydride comprises $LiBH_4$.

7. The method of claim 1, wherein the chemical hydride is exposed to a temperature of at least about 110° C.

8. The method of claim 1, wherein the chemical hydride is exposed to a temperature of not greater than about 150° C.

9. The method of claim 1, wherein the chemical hydride is exposed to a temperature of not greater than about 130° C.

10. The method of claim 1, wherein the chemical hydride is exposed to a relative humidity of at least about 30%.

11. The method of claim 1, wherein the chemical hydride is exposed to a relative humidity of at least about 40%.

12. The method of claim 1, wherein the chemical hydride is exposed to a relative humidity of at least about 50%.

13. The method of claim 1, further comprising collecting the hydrogen gas.

14. The method of claim 1, further comprising removing the byproduct material from the reaction chamber.

15. The method of claim 1, wherein water from the first reaction chamber is transferred to the second reaction chamber.

* * * * *